July 20, 1943. M. O. KUHN 2,324,982
APPARATUS FOR EXPANDING AND SHAPING ANNULAR ARTICLES
Filed June 21, 1940 6 Sheets-Sheet 3
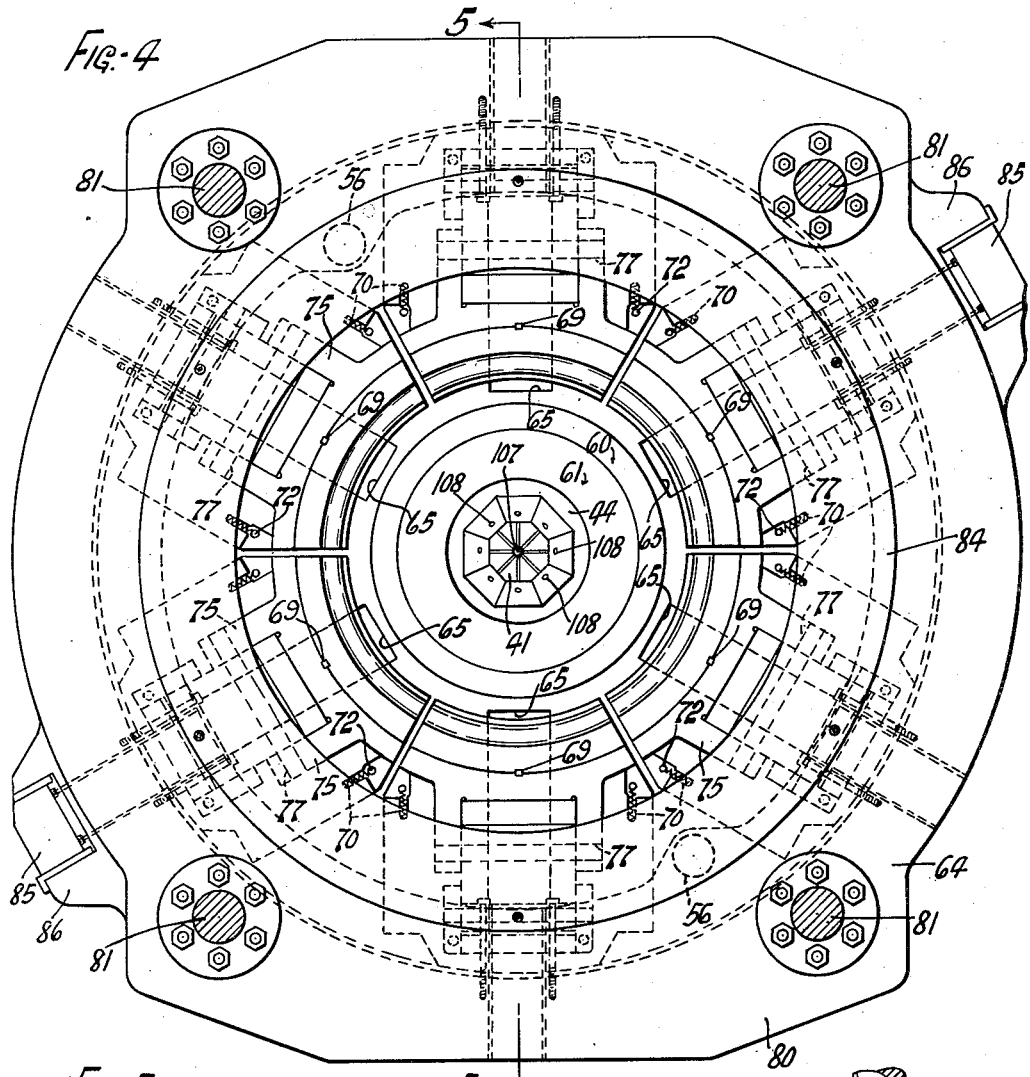
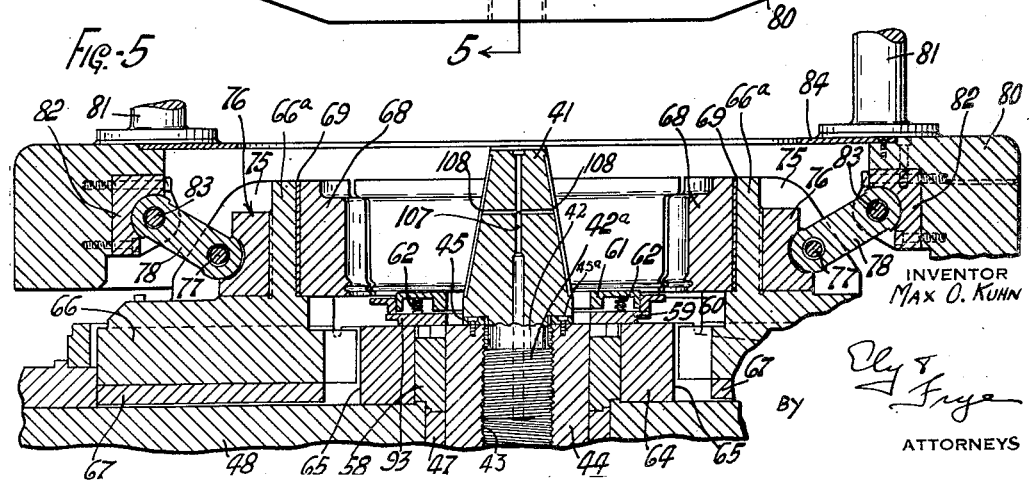
INVENTOR
MAX O. KUHN
BY
ATTORNEYS July 20, 1943.  M. O. KUHN  2,324,982
APPARATUS FOR EXPANDING AND SHAPING ANNULAR ARTICLES
Filed June 21, 1940   6 Sheets-Sheet 4

INVENTOR
Max O. Kuhn
BY
ATTORNEYS

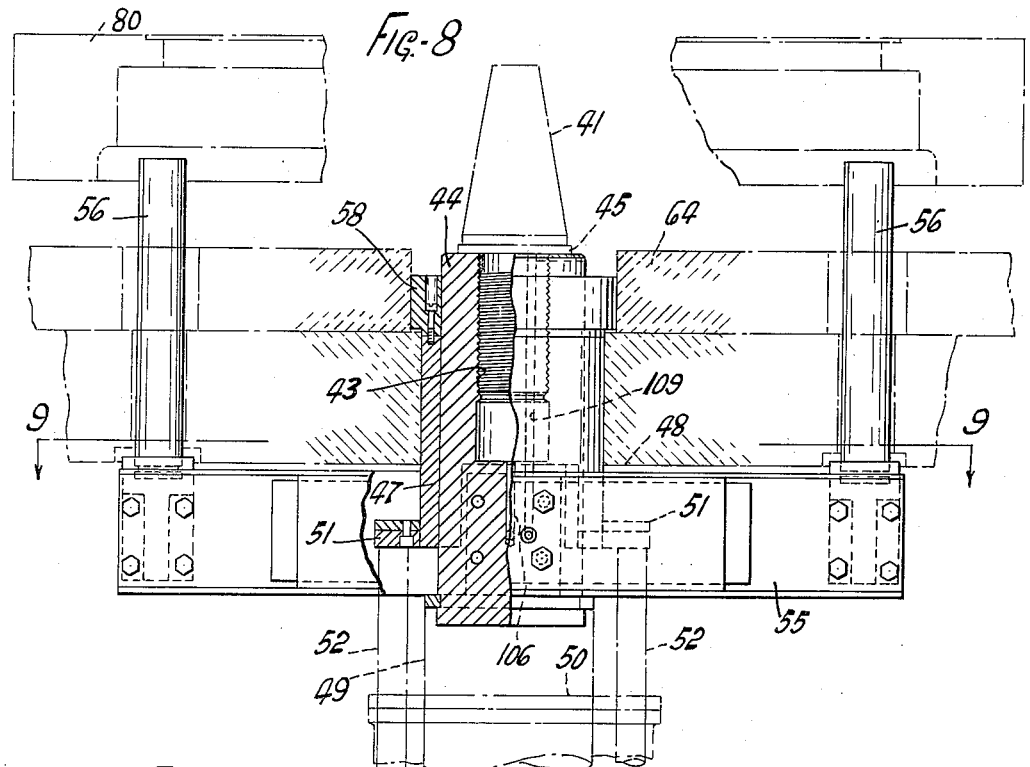
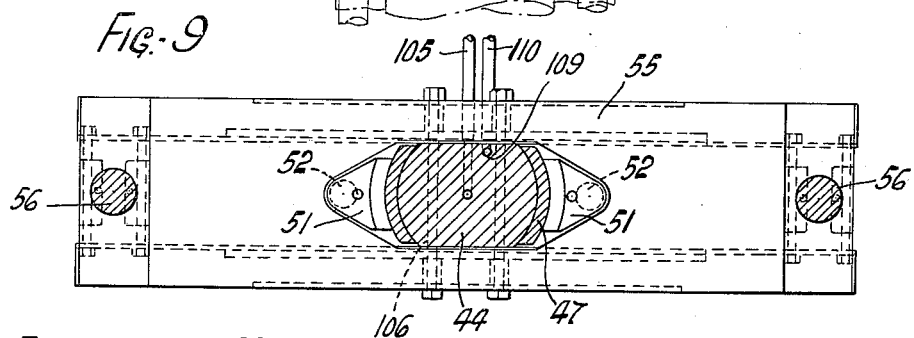
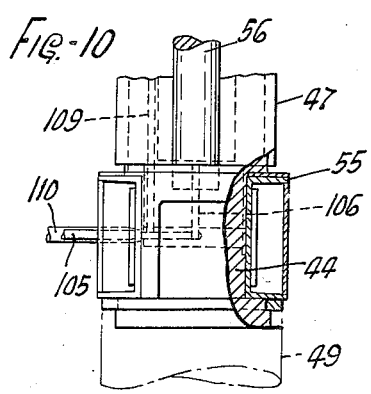

July 20, 1943.  M. O. KUHN  2,324,982
APPARATUS FOR EXPANDING AND SHAPING ANNULAR ARTICLES
Filed June 21, 1940  6 Sheets-Sheet 6

INVENTOR
Max O. Kuhn
BY Ely & Frye
ATTORNEYS

Patented July 20, 1943

2,324,982

UNITED STATES PATENT OFFICE 2,324,982

APPARATUS FOR EXPANDING AND SHAPING ANNULAR ARTICLES

Max O. Kuhn, Cuyahoga Falls, Ohio, assignor to The Firestone Tire & Rubber Company, Akron, Ohio, a corporation of Ohio Application June 21, 1940, Serial No. 341,713

13 Claims. (Cl. 153—2)

This invention relates to apparatus for expanding and shaping annular articles, and more especially it relates to apparatus for distending a metal ring to determinate size and for in-turning one of the marginal portions thereof.

The invention is of primary utility in the manufacture of tire rims such as are used for the mounting of pneumatic vehicle tires. Tire rims of the character mentioned usually are made from relatively long metal strips that first are hot or cold rolled substantially to the desired transverse profile. Thereafter the strips are cut to shorter individual lengths, the latter then being bent arcuately to ring shape and the ends of the rings joined together by electric welding to provide endless rings. Such rings are smaller in diameter than ultimately is desired, so that they require to be radially distended to bring them to proper size. Furthermore, one marginal portion of the rings requires to be bent inwardly to bring them to the proper transverse profile. Heretofore the distending of the rings and the turning of their margins has been performed by separate apparatus, requiring transporting of the rings from one apparatus to the other. Furthermore, the apparatus frequently was out of order, and incurred considerable maintenance expense.

The chief objects of the invention are to reduce labor cost in the distending and shaping of annular metal articles; to increase the production of the articles without additional labor cost; to provide improved apparatus for the distending and shaping of the articles; to provide apparatus of the character mentioned that will have longer useful life than apparatus heretofore available; and to effect a reduction in the maintenance expense of apparatus for the purpose set forth. Other objects will be manifest as the description proceeds.

Of the accompanying drawings:

Figure 4 is a sectional plan view, on a larger scale, taken on the line 4—4 of Figure 1;

Figure 5 is a section on the line 5—5 of Figure 4;

Figure 8 is a detail view of the expander-cone support and ejector mechanism, a part thereof being broken away and in section;

Figure 9 is a section on the line 9—9 of Figure 8;

Figure 10 is an end view of the structure shown in Figure 9, as viewed from the left thereof;

Figure 1:
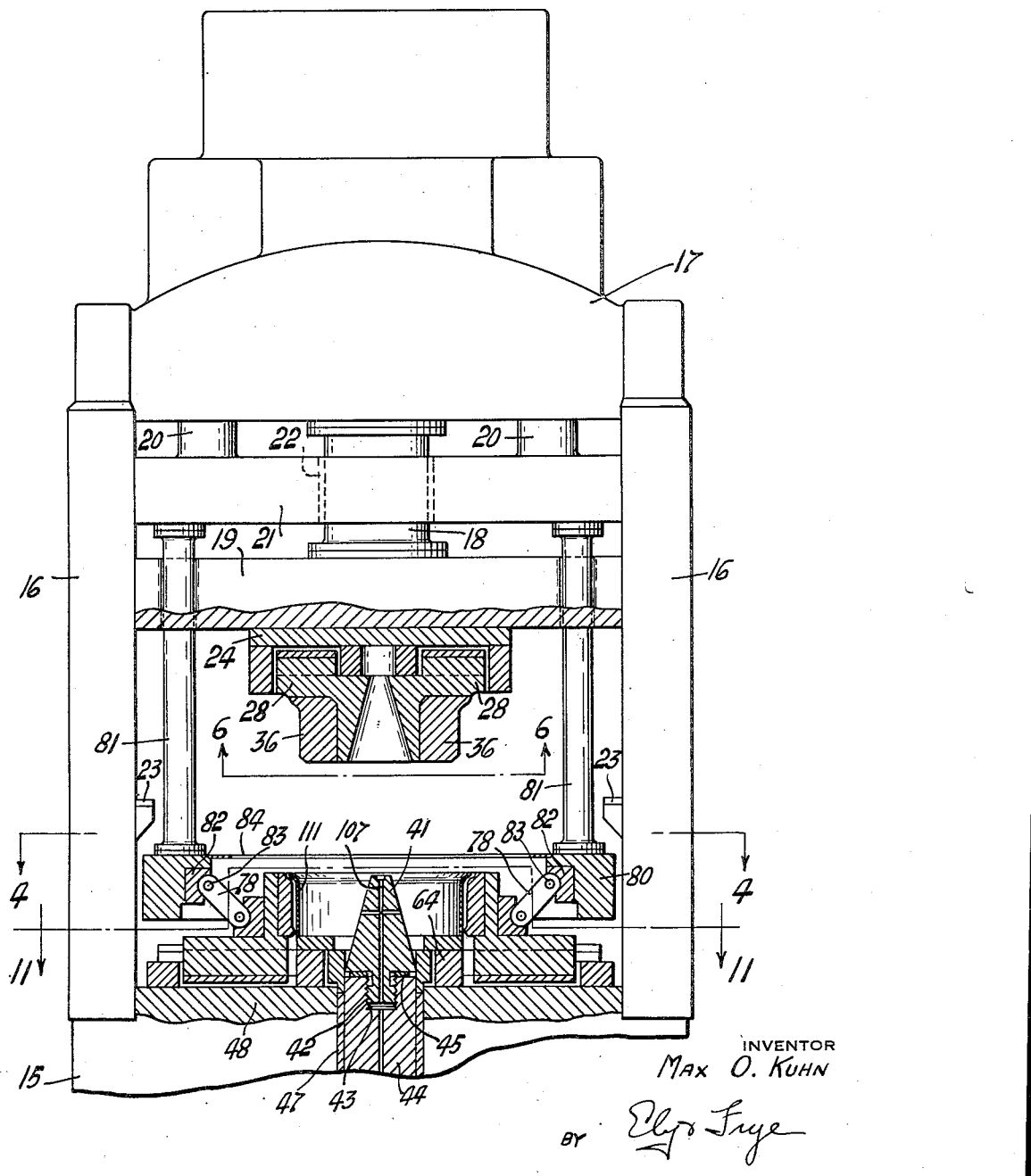
Figure 1 is a front elevation of apparatus embodying the invention, a portion at the bottom thereof being broken away, and a part being in section, the apparatus being shown in open, inoperative position, and including the work therein.

Referring to the drawings, especially Figure 1 thereof, there is shown a press structure comprising a base 15, lateral support plates 16, 16 rising vertically from each side thereof, and an upper press head 17 carried upon the tops of the supporting plates 16. Centrally positioned interiorly of the upper press head 17 is a fluid pressure operated cylinder (not shown) that is provided with a downwardly extending piston rod or ram 18 to the lower end of which is attached a platen 19. Also mounted within the head 17 at opposite sides of the said fluid pressure cylinder therein are smaller fluid pressure cylinders (not shown) that are vertically disposed and have respective downwardly extending piston rods 20 to the lower ends of which is attached a platen or cross head 21. The latter is positioned above the platen 19, and is formed with a central aperture 22 through which the piston rod 18 extends. The cylinders of which the piston rods 20 are a part are arranged to operate in unison, and in timed relation to the cylinder that operates piston 18, whereby the platens 19, 21 may be raised and lowered relatively of each other. Fixed abutments 23 are mounted upon the respective lateral supports 16 for limiting the downward movement of the platen 19.

Figure 6:
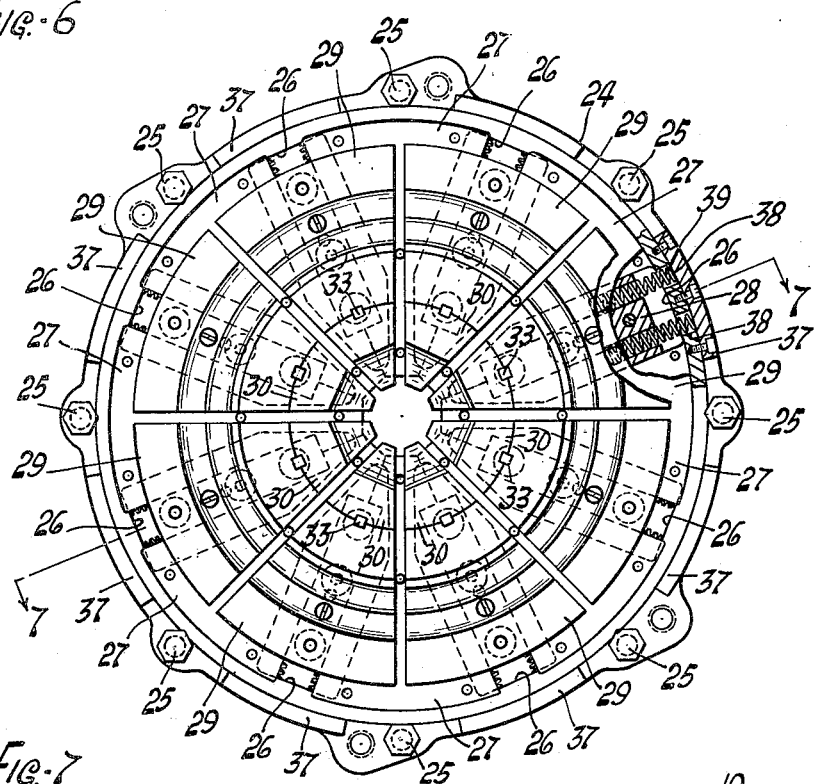
Figure 6 is a bottom plan view, on a larger scale, of the upper work-engaging elements, as viewed from the line 6—6 of Figure 1.
Figure 7:
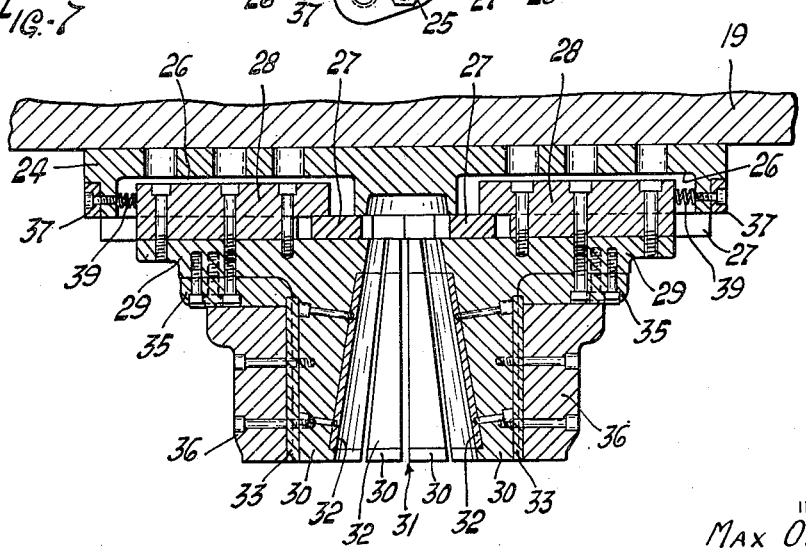
Figure 7 is a section on the line 7—7 of Figure 6.

Mounted upon the bottom face of the platen 19 is a plate-like spider 24 that is secured to the platen by a plurality of cap screws 25, 25, Figures 6 and 7. The downwardly presented face of the spider 24 is formed with a plurality of radially disposed recesses 26, 26, herein shown as eight in number, and secured to said spider between the respective recesses are wear plates 27, 27, which wear plates are of general wedge shape in plan, and have their lateral marginal portions somewhat overlapping the lateral walls of the recesses 26. At their inner ends the lateral faces of the wear plates are in abutting relation, the inner ends of the plates being spaced somewhat from the axis of the spider 24. Mounted for longitudinal movement within each recess 26 of the spider is a gib 28 that is supported by the marginal portions of the wear plates 27 that overlap the recess, each gib having a downwardly extending portion that projects between the adjacent wear plates. Secured to said downwardly projecting portion of each gib 28 is a segment 29, the arrangement being such that the circumferential series of segments are movable radially, inwardly and outwardly, by reason of the slidable mounting of the gibs 28. The inner end portion of each segment 29 is of considerably greater axial thickness than the remainder thereof, which thickened portion projects downwardly and is designated 30. The inner end faces of the segment structures 29, 30 are flat and disposed somewhat outwardly of the axis of the spider 24, said end faces also being obliquely disposed with relation to said axis, with their upper ends nearer the same. The arrangement is such that the inner end faces of the segments define a vertical, eight-sided recess 31 that tapers toward its upper end. The said inner end faces of the segments are each provided with a suitable wear plate 32, Figure 7. The outer arcuate faces of the portions 30 of segments 29 are provided with respective vertically disposed keys 33.

Secured to the under side of each segment 29, outwardly of its downwardly extending portion 30, is a filler plate 35, and below the latter is an arcuate shoe 36 that is secured to said portion 30, over the key 33 therein. The outer face of each shoe 36 has the shape of a sector of a tire rim, upon the inner circumference of the latter. The arrangement is such that when the circumferential series of shoes 36 are disposed within a tire rim, concentrically thereof, and moved radially outwardly, they will effect the distending of the tire rim to a determinate diametric dimension. Mechanism for moving the shoes 36 radially outwardly presently will be described. Normally the shoes are in retracted position, that is, in their radially innermost positions, being yieldingly held in this position by spring means. To this end, spring caps 37, 37 are bolted to the perimeter of the spider 24 opposite the outer end of each recess 26 therein. The spider-wall back of each cap is formed with two apertures 38, 38 to enable the outer ends of respective compression springs 39 to bear against said cap, the inner end portions of said springs being received in suitable parallel bores in the gib 28 within the recess 26.

Moving of the shoes 36 radially outwardly, to expand a tire rim, is effected by means of an expanding element consisting of a truncated octagonal pyramid 41, the smaller end of which is uppermost. The latter is disposed coaxially of the group of segments 29, 30, and may be elevated into engagement with the inner faces of said segments and thereby to force the segments radially outwardly against the force of the springs 39, said springs restoring the segments to their inner positions when the expanding member 41 is retracted, that is, lowered to its inoperative position. As shown in Figures 5 and 8, the expander 41 is formed at its bottom with an axial stem 42 that is formed with male threads 42a at its lower end portion, and is threaded into an internally threaded axial recess 43 formed in the upper end of a vertical ram 44. A two-piece stop-ring or collar 45 closely embraces the unthreaded upper end of the stem 42 and is secured to the top of ram 44 by screws 45a, the arrangement being such as to enable the expander 41 to be adjusted vertically relatively of the ram, the collar 45 limiting the extent to which the expander may be adjusted upwardly.

The major portion of the ram 44 has a sliding fit within a tubular ejector sleeve 47, and the latter has a sliding fit in a bolster 48 constituting a portion of the base structure 15 of the apparatus. The ram 44 and ejector sleeve 47 are movable axially relatively of each other, and to this end the ram is rigidly secured at its lower end to the upper end of the piston 49 of a fluid pressure operated cylinder 50 located within the base of the apparatus, below the bolster 48. At diametrically opposite sides of the ejector sleeve 47, at the lower end thereof, are secured respective ears 51 that are connected to the upper ends of piston rods 52, 52 of respective cylinders that are cast integral with the cylinder 50. The cylinders that operate piston rods 52 are arranged to operate in unison, and independently of the operation of piston 49.

At points 90° removed from the ears 51 the lower end portion of the ejector sleeve 47 is cut away and the lower end portion of the ram 44 is formed with diametrically opposed flat faces, and secured to the latter is a yoke 55 that projects radially in opposite directions from said ram. Mounted upon the outer ends of the yoke 55 are respective upwardly extending posts or pins 56 that extend freely through suitable apertures in the bolster 48 and terminate at some distance above the latter, for a purpose presently to be explained. The arrangement is such that the yoke 55 and posts 56 will move up and down with the ram 44, independently of the up and down movement of the ejector sleeve 47.

Mounted upon the upper end of the ejector sleeve 47 is an ejector ring 58 of somewhat larger diameter than said sleeve, and mounted upon the upper margin of the ejector ring is an ejector base 59 that is concentric with ring 58 and substantially the same inside diameter as the latter, but of somewhat larger outside diameter. Fixedly secured to the top face of the ejector base 59 is an annular ejector tray 60 that is concentric with the base 59 and overhangs the periphery of the latter, the inside diameter of the tray 60 being considerably larger than the inside diameter of the base 59. Mounted upon the ejector base 59, within the tray 60, is an annular locator 61 that is yieldingly supported by a plurality of compression springs 62, 62, the arrangement being such that the upper face of the locator normally is positioned slightly above the top face of the tray 60, as is shown in Figure 5, but may be depressed to a position flush with said tray. The outside diameter of the locator in somewhat smaller than the inside diameter of a tire rim to be expanded in the apparatus, and bases 59, trays 60, and locators 61 of various diameters are provided for adapting the apparatus to receive tire rims of different diameters. During the mounting of a tire rim in the apparatus, the ejector mechanism is in an elevated position where a tire rim conveniently may be placed thereon, the locator fitting within the inside circumference of the rim so as substantially to center the rim with relation to the vertical axis of the apparatus. The ejecting mechanism is lowered during the operations of expanding and shaping the rim, but is elevated again as a final phase of operation to raise the finished work to a position where it is easily removed from the apparatus.

In addition to the mechanism hereinbefore described for expanding a tire rim, the apparatus also comprises mechanism for shaping the tire rim by in-turning a marginal portion thereof, which margin is at the bottom of the rim as it is mounted in the apparatus. Said rim-shaping mechanism comprises a base casting 64 that is mounted upon the top of bolster 48, said base being axially apertured to enable the ejector ring 58 to pass therethrough, the ejector base 59, tray 60, and locator 61 being disposed above said base 64 at all times. Said base 64 also is formed with suitable apertures through which the posts 56 extend, and with a plurality of radial slots 65, 65, herein shown as six in number, which slots are symmetrically arranged, and which constitute guideways for respective segments or slides 66, the latter having portions that extend through said slots and have respective retaining plates 67 secured to their bottom faces, below said slots. At their inner ends the slides 66 are formed with respective upstanding arcuate walls 66a that present concave faces to the vertical axis of the apparatus, and secured to the said concave faces of said walls 66a are arcuate shoes 68, there being a key 69 between each wall 66a and shoe 68 to facilitate accurate positioning of the latter. The inwardly presented face of each shoe 68 has the shape of a sector of a tire rim upon the outer circumference of the latter, and when the slides 66 are moved to their innermost position, said shoes engage the tie rim and bend the lower marginal portion thereof inwardly. Each slide 66 normally is urged radially outwardly by means of a pair of compression springs 70, 70 that are mounted in respective bores formed in opposite sides of the slide, parallel to its guideway 65, the outer ends of the springs bearing against respective adjustable plugs 71 threaded into said bores, the inner ends of the springs projecting from the slides and bearing against respective studs 72 that project upwardly from the base 64.

Extending from the rear of each upstanding wall 66a to the top face of the slide 66 are parallel, spaced apart webs or ears 75, 75, and secured to said wall 66a, between said ears, is a bearing block 76. Secured at its respective ends in the pair of ears 75 is a pivot pin 77, and pivotally mounted upon the latter is one end of a link 78, the end face of the link being arcuate, concentric with the pin 77. There is a slight clearance between the pin 77 and the aperture in the link 78 through which it extends so as to permit a modicum of relative movement or play therebetween. The rear face of the bearing block 76 is formed with an arcuate surface that is concentric with the pin 77, and of the same radius as the end of the link 78. The links 78 are utilized for moving the slides 66 radially inwardly against the force of the springs 70, and during this operation, the play of the links 78 upon the pins 77 enables the arcuate end faces of the links to move into engagement with the complementally arcuate surfaces of the respective bearing blocks 76, with the result that no pressure is exerted upon the pins 77, and breakage, and maintenance expense due to breakage of the pins is obviated. Retraction of the slides 66 after they have been moved inwardly is effected by the springs 70, but if the force of the springs is not sufficient, the links 78 will draw the slides outwardly, this operation imposing but little strain upon the pins 77.

To the links 78 is imparted longitudinal movement for effecting the radial movement of the slides 66 as described, and to this end a shrinker ring 80 is provided, which ring is disposed concentrically of the vertical axis of the apparatus, above the base 64 and below the platen 19. Said shrinker ring is supported by four stilts or posts 81, 81 that rise from the top side of the ring and are attached at their upper ends to the bottom face of the platen 21, said posts extending through suitable apertures in the platen 19. Thus the shrinker ring is movable axially, up and down, by the operation of the cylinders of which piston rods 20 are a part. Mounted upon the inner circumferential portion of the ring 80 are six symmetrically arranged bearing blocks 82, 82, each of which is formed with a pair of lateral, spaced ears that support a pivot pin 83 upon which the outer end of a link 78 is pivotally mounted. There is a modicum of play between each link 78 and its pivot pin 83, and the bearing block behind said pin is formed with an arcuate surface concentric with said pin, which surface is engaged by a complementally arcuate surface on the end of the link 78 during the pressure phase of shaping a tire rim. The arrangement is such as to avoid the imposition of heavy shearing strains on the pivot pins 83 in the same manner as the pins 77 at the other ends of the links are protected from similar strains. A guard ring 84 may be mounted upon the top of the shrinker ring in a position that overlies the links 78. In order to prevent torsional strains on the shrinker ring 80 from turning it angularly relatively of the base 64 and mechanism carried thereby, said base is formed with two upstanding fixtures 85, 85 that are rectangular in transverse section and are disposed at diametrically opposite points on the base. Said fixtures are slidingly engaged on three of their lateral faces by respective grooved ears 86, Figure 4, that project from the perimeter of the shrinker ring 80 at diametrically opposite points thereof.

Figure 11:
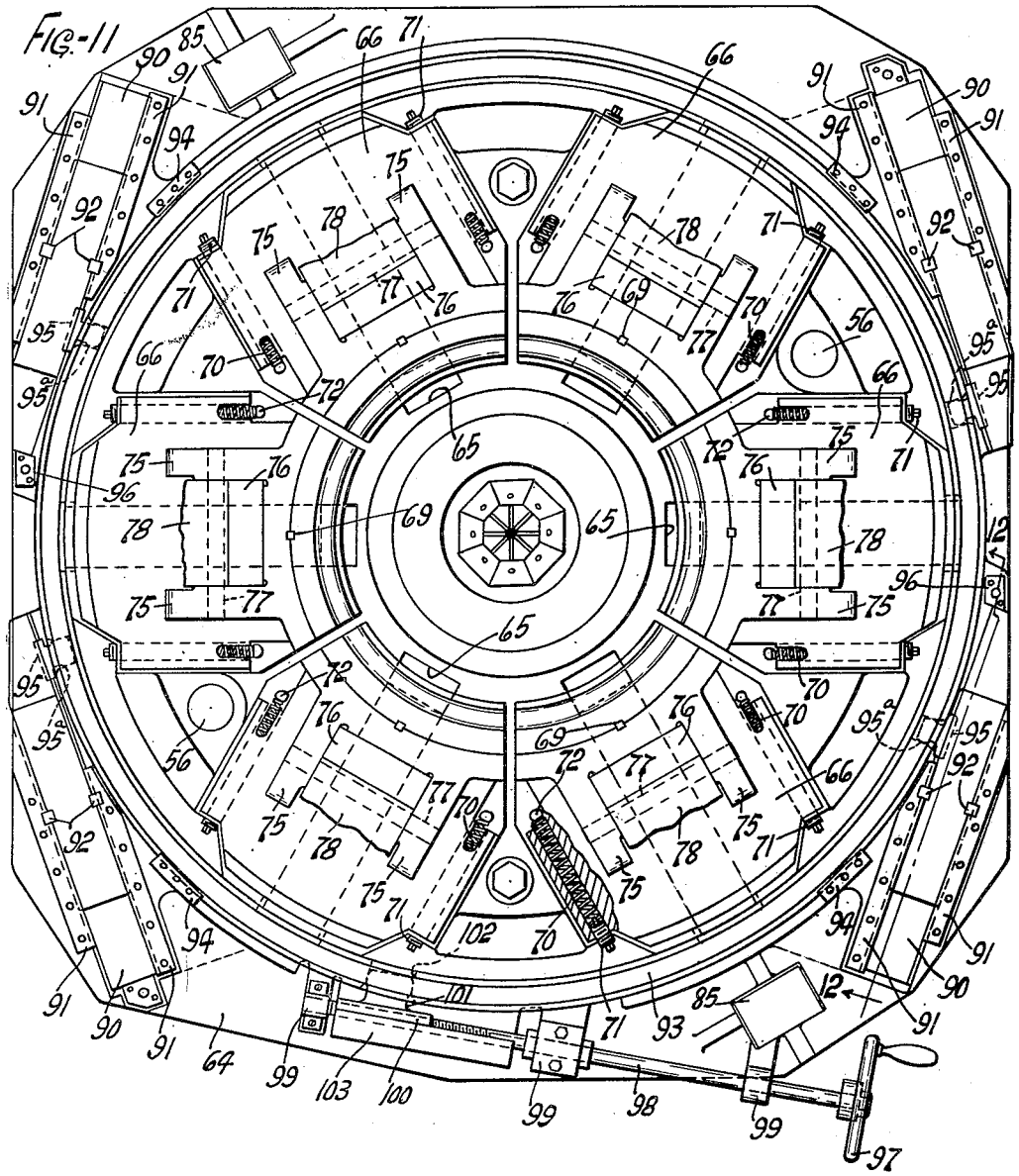
Figure 11 is a sectional plan view taken on the line 11—11 of Figure 1.
Figure 12:
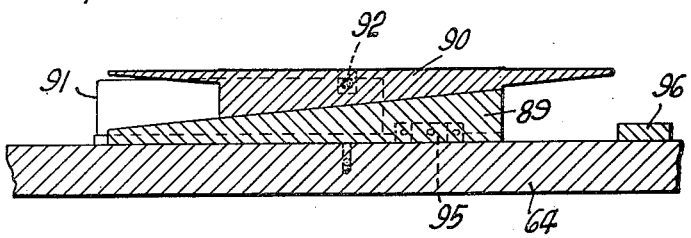
Figure 12 is a section on the line 12—12 of Figure 11.

As previously stated, the shrinker ring is capable of up and down movement, and during such movement the links 78 move the slides 66 radially outwardly and inwardly with a toggle action that causes the shoes 68 to exert great radial pressure upon the perimeter of a tire rim mounted in the apparatus. The piston rods 20 are capable of a 5 inch stroke for moving the shrinker ring 80 up and down, and of said 5 inch stroke, 4½ inches are relatively fast and ½ inch is relatively slow during the downward movement of the piston rods, since during the latter part of the downward movement the shoes 68 are in engagement with the work. The shoes 68 are replaceable with other shoes of different radial thickness to adapt the apparatus to tire rims of various diameters, and in some cases it is desirable to vary the extent of radial movement of said shoes. To this end means is provided for stopping the descent of the shrinker ring 80 before it has reached the lowermost limit of its downward stroke. Said means is best shown in Figures 11 and 12, and it comprises four stops or abutments that are mounted upon the base 64, below the shrinker ring 80, said stops being concurrently adjustable up or down. Each of said stops comprises a lower wedge 89, and an upper wedge 90 superposed thereon, said lower wedge being slidably supported upon the base 64, and being longitudinally movable between a pair of laterally positioned gibs 91, 91, to raise and lower the upper wedge 90. Keys 92 between the lateral faces of the upper wedge and the gibs 91 prevent longitudinal movement of the upper wedge during such movement of the lower wedge. For effecting longitudinal movement of the lower wedges 89, concurrently and to the same extent, a ring 93 is provided, which ring is mounted upon the base 64, concentric with the axis of the apparatus, inwardly of the aforesaid wedge devices. The ring 93 is held in place by four guide clamps 94, 94, and is rotatable about its axis. Secured to each of the lower wedges 89 is a laterally projecting arm 95, the outer end portion of which has convex lateral faces and is received in a recess 95a formed in the ring 93, the arrangement being such that angular movement of the ring upon its axis will cause concurrent longitudinal movement of each of the lower wedges 89. Stop blocks 96 limit the longitudinal movement of two of the wedges 89 and consequently limit the movement of the ring 93 in one direction. For rotating the ring 93, a hand wheel 97 is provided, said handwheel being mounted upon one end of a shaft 98 that is journaled in bearing brackets 99, 99 mounted upon the base 64 at the front of the apparatus, said shaft being disposed tangentially of the ring 93, adjacent the perimeter thereof. One end portion of the shaft 98 is threaded as shown, and mounted upon said threaded portion is a nut 100 that is formed with a laterally projecting arm portion 101 that is slidably received in a recess 102 formed in the ring 93. The arrangement is such that rotation of the shaft 98 will move the nut 100 axially along the threaded portion thereof and thereby effect rotational movement of the ring 93. A gib 103 may be provided for restraining the nut 100 against turning movement as the shaft 98 is rotated.

It is desirable that the expander 41 be well lubricated since it is required to slide relatively of the segments 29, 30, and to this end a supply pipe 105, Figures 9 and 10, of lubricant is provided, said supply pipe discharging into a duct 106 in the ram 44, which duct discharges into the axial recess 43 in the latter. The expander 41 that has its stem threaded into said recess is formed with an axial duct 107 that discharges onto the top of the expander, there also being branch ducts 108 that extend radially from the duct 107 and discharge onto the respective lateral faces of the expander. The top of the expander may be radially grooved as shown to conduct lubricant discharged from the top of the duct 107 to the lateral faces thereof. For removing excess lubricant that flows to the lower end of the expander and onto the upper end of the ram 44, a drainage duct 109 is formed in the latter, said duct at its upper end opening onto the upper end of the ram, and at its lower end discharging into a drainage pipe 110. An annular metal tire rim which constitutes the work is shown at 111 in the drawings.

Figure 2:
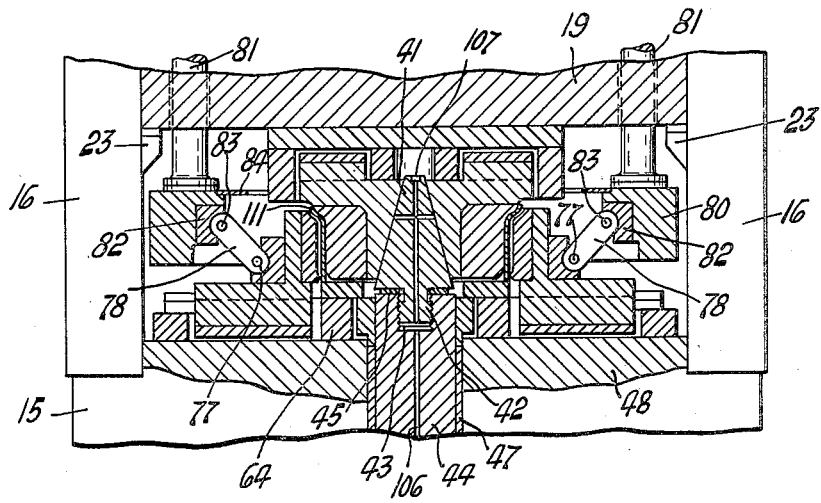
Figure 2 is a section of the work-engaging parts shown in Figure 1 in the operative position they assume during the first phase of operation, namely, the distending of the work.

With the apparatus described, two alternative methods of operation are possible. Considering the first method, a cycle of operation starts with the apparatus in its inoperative position, in which position the platens 19, 21 are in elevated position, as is the ejector tray 60, the top of the latter then being substantially even with the top of the guard ring 84 of the shrinker ring 80. At this time the expander 41 is in the depressed position shown in Figures 1 and 3. With the apparatus so positioned, a tire rim 111 to be shaped is manually placed upon said ejector tray, the locator 61 facilitating the centering of the rim on the tray. Next, the respective fluid pressure cylinders that operate platen 19 and expander 41 are concurrently charged to effect the lowering of the platen 19 and the elevating of the expander 41, the latter reaching its elevated operative position first, since its range of axial movement is only 5 inches. Continued descent of the platen 19 carries the work-engaging shoes 36 thereon into telescopic relation with the tire rim 111, and when complete telescoping is effected said shoes engage the locator 61 and depress it against the ejector base 59, and thereafter depress the ejector mechanism against the pressure of its fluid pressure cylinders. Preferably the latter are discharged while the ejector mechanism is moved downwardly. As the platen 19 approaches the limit of its downward traverse, the slides 29 engage the surface of the expander 41 and are moved radially outwardly thereby, against the pressure of their springs 39, thus forcing their shoes 36 against the inner circumference of the tire rim 111 and distending the latter to the desired circumference. Downward movement of the platen 19 ceases when it meets the abutments 23. This position of the various elements of the apparatus is shown in Figure 2.

Figure 3:
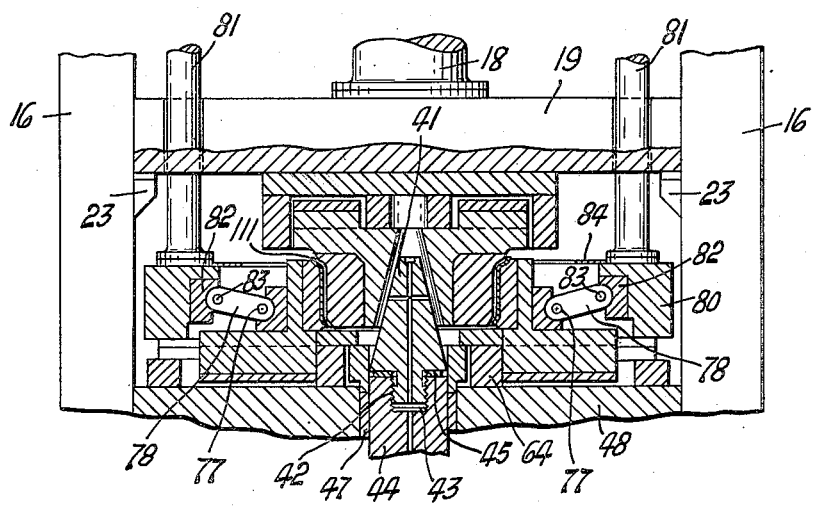
Figure 3 is a section similar to Figure 2 showing the position of the work-engaging elements in the second phase of operation, namely, the inward deforming of a margin of the work.

Next, expander 41 is caused to descend to its inoperative position, whereupon the springs 39 restore the slides 29 to their inner position, thus moving the shoes 36 out of engagement with the tire rim 111, this position of the apparatus being shown in Figure 3. As the expander 41 descends, the platen 19 starts rising to remove the shoes 36 from telescopic relation to the work, and platen 21 starts downwardly, carrying with it the shrinker ring 80. If at this time the expander 41 has for any reason not been lowered, said shrinker ring will strike the upper ends of the posts or pins 56 and force said expander downwardly through the agency of the yoke 55. Descent of the shrinker ring 80 causes the links 78 to force the slides 66 radially inwardly, against the force of springs 70, with the result that the shoes 68 on said slides engage the periphery of the tire rim 111, at the lower marginal portion thereof, and turn said marginal portion inwardly, as shown in Figure 3. Downward movement of the shrinker ring 80 ceases when said ring bears against the stops or abutments comprising the wedges 90. Thereafter the shrinker ring is returned to its elevated position to retract the slides 66 and shoes 68 from the tire rim, after which the ejector mechanism is operated to restore the ejector tray 60 to elevated position with the finished work thereon. The latter then may readily be removed from the apparatus. This completes a cycle of operation, which may be repeated as soon as another tire rim is mounted upon the tray 60.

In an alternative method of operation the platen 19 descends to fully lowered position before the ascent of the expander 41 begins. The other steps of the alternative method preferably are the same as in the method of operation first described. Obviously somewhat faster operation and greater production may be achieved by the first described method of operation. With either method it is possible to achieve at least 300 cycles of operation per hour of continuous operation.

By means of the improved apparatus, it is possible to produce tire rims at reduced cost, this being the result of increased speed of operation and less manual labor required for handling the rims. The invention also effects savings due to lower maintenance expense, and achieves the other advantages set out in the foregoing statement of objects.

Modification may be resorted to without departing from the spirit of the invention, or the scope thereof as defined by the appended claims.

What is claimed is:

1. In apparatus for expanding and shaping annular articles, the combination of an annular support for an article, which support is axially movable between an elevated inoperative position and a depressed operative position, a circumferential series of radially movable slides concentric with said support and circumscribing the work thereon in the depressed operative position thereof, a second series of radially movable slides, which series is movable axially from an elevated position to telescoping position within the work in the inoperative and operative positions of the latter, means for moving the last mentioned slides radially outwardly to expand the annular article on the work-support, and means for moving the other series of slides inwardly for shaping a local circumferential region of said article.

2. A combination as defined in claim 1, including a centering device on the work-support for centering the annular article thereon.

3. A combination as defined in claim 1, including an annular, upwardly projecting, yieldingly mounted centering device on the work-support for centering the annular article thereon, said centering device being depressible when engaged by the outwardly movable slides.

4. In apparatus for expanding and shaping annular articles, the combination of an annular support for an article, which support is axially movable between an elevated inoperative position and a depressed operative position, a circumferential series of radially movable slides concentric with said support and circumscribing the work thereon in the depressed operative position thereof, a second series of radially movable slides, which series is movable axially from an elevated position to telescoping position within the work in the inoperative and operative positions of the latter, a tapered expander movable upwardly through the said work-support and into wedging engagement with the last mentioned slides, at the axis of the series thereof, to move said slides radially outwardly to expand the article on the work-support, and means for moving the first mentioned series of slides inwardly to shape a local circumferential region of the expanded article.

5. In apparatus for expanding and shaping annular articles, the combination of an annular support for an article, which support is axially movable between an elevated inoperative position and a depressed operative position, a circumferential series of radially movable slides concentric with the said support and circumscribing the work thereon in the depressed operative position thereof, a second series of radially movable slides, which series is movable axially from an elevated position to telescoping position within the work in the inoperative and operative positions respectively of the latter, a tapered expander movable upwardly through said work support into wedging engagement with the last mentioned slides, at the axis of the series, to move said slides radially outwardly to expand the article on the work support, an axially movable shrinker ring disposed concentrically of the axis of the apparatus, and links pivotally connecting the shrinker ring to the respective slides of the first mentioned series for moving said slides radially inwardly to shape a local circumferential region of the expanded article.

6. A combination as defined in claim 5 including means cooperating with the shrinker ring for assuring that the expander will be moved downwardly out of engagement with its slides before said shrinker ring moves its slides to their innermost position.

7. A combination as defined in claim 5 including a vertically movable ram for effecting axial movement of the expander, a yoke carried by said ram, and posts extending upwardly from the respective ends of said yoke, said posts having their upper ends disposed immediately below the shrinker ring, in the elevated position of the latter, whereby said shrinker ring may strike said posts and lower the ram if said ram is not lowered prior to the descent of said shrinker ring.

8. Apparatus of the character described, comprising a circumferential series of radially movable slides, a tapered expander engageable with the inner ends of the slides for moving them radially outwardly, means for moving said expander and series of slides relatively of each other in an axial direction to effect operative engagement of the expander and slides, said means comprising a reciprocatory ram, an axial stem on said expander threaded into an axial bore in an end of the ram whereby axial adjustment of the expander may be effected by rotating it, and a stop collar on the end of the ram closely embracing the expander stem to limit outward adjustment of said expander.

9. Apparatus of the character described, comprising an annular series of radially movable slides, yielding means normally urging said slides outwardly, a shrinker ring in circumscribing relation to said slides and concentrically thereof, means for reciprocating said slide in an axial direction, links interposed between the inner circumference of the slide and the outer faces of the respective slides, said links having arcuate end faces adapted to swivel in complementally arcuate faces formed on the ring and slides upon axial movement of the ring in one direction, and pivot pins securing the links to the ring and to the slides, there being substantial clearance of the links about said pivot pins so as to enable relative movement therebetween.

10. Apparatus of the character described, comprising an annular series of radially movable slides, a shrinker ring in circumscribing relation to said slides and concentrically thereof, means connecting said shrinker ring to the respective slides in such a manner that axial movement of the shrinker ring effects radial movement of the slides, means for reciprocating said ring in an axial direction, a plurality of adjustable abutments disposed beneath said shrinker ring for limiting the downward movement thereof, and means for concurrently adjusting the height of said abutments.

11. The combination as defined in claim 10 in which each of the adjustable abutments comprises a pair of opposed wedges of which one is superposed upon the other, said wedges being movable longitudinally relatively of each other to raise or lower the uppermost wedge.

12. Apparatus of the character described, comprising an annular series of radially movable slides, a shrinker ring in circumscribing relation to said slides and concentric therewith, means connecting said shrinker ring to the respective slides in such a manner that axial movement of the shrinker ring effects radial movement of the slides, means for reciprocating said shrinker ring in an axial direction, a plurality of abutments disposed beneath the shrinker ring to limit the downward movement thereof, each of said abutments comprising opposed wedges of which the upper wedge is raised or lowered when the lower wedge is moved longitudinally relatively thereof, an adjusting ring circumscribing the slides and operatively connected to the lowermost wedge of each pair, and means for moving said adjusting ring about its axis.

13. Apparatus of the character described comprising an annular series of radially movable slides, a shrinker ring in circumscribing relation to said series of slides and concentrically thereof, means for reciprocating said ring in an axial direction, links interposed between the shrinker ring and the respective slides, said links having convex arcuate end faces adapted to engage complementally arcuate bearing surfaces on the ring and the slides upon axial movement of the ring in one direction, and pivot pins having a loose fit in the links connecting the latter to the shrinker ring and the slides.

MAX O. KUHN.